US012391114B2

(12) United States Patent
Rapp et al.

(10) Patent No.: US 12,391,114 B2
(45) Date of Patent: Aug. 19, 2025

(54) SYSTEMS FOR ELECTRIFIED VEHICLE

(71) Applicant: Dana Automotive Systems Group, LLC, Maumee, OH (US)

(72) Inventors: Jeremy A. Rapp, Maumee, OH (US); Nathan Mandery, Perrysburg, OH (US); Kyle Mourdock, Bowling Green, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 625 days.

(21) Appl. No.: 17/657,722

(22) Filed: Apr. 1, 2022

(65) Prior Publication Data
US 2023/0311649 A1 Oct. 5, 2023

(51) Int. Cl.
| *B60K 17/16* | (2006.01) |
| *B60K 1/02* | (2006.01) |
| *B60K 17/02* | (2006.01) |
| *B60K 23/08* | (2006.01) |
| *F16D 11/16* | (2006.01) |
| *F16H 37/08* | (2006.01) |
| *B60K 1/00* | (2006.01) |

(52) U.S. Cl.
CPC ............ *B60K 23/0808* (2013.01); *B60K 1/02* (2013.01); *B60K 17/02* (2013.01); *B60K 17/16* (2013.01); *B60K 2001/001* (2013.01)

(58) Field of Classification Search
CPC ...... B60K 23/0808; B60K 1/02; B60K 17/02; B60K 17/16; B60K 17/26; F16D 28/00; F16D 11/16; F16H 37/08
See application file for complete search history.

(56) References Cited

U.S. PATENT DOCUMENTS

| 5,038,884 | A | 8/1991 | Hamada et al. |
| 5,098,360 | A * | 3/1992 | Hirota ............... F16H 48/24 |
| | | | 475/237 |
| 7,863,789 | B2 | 1/2011 | Zepp et al. |
| 7,975,796 | B2 | 7/2011 | Guo |
| 9,011,289 | B2 | 4/2015 | Goleski et al. |
| 10,710,453 | B2 | 7/2020 | Ryman et al. |
| 10,830,292 | B2 | 11/2020 | Kuwahara |
| 10,851,843 | B2 * | 12/2020 | Shibata ............... F16H 48/30 |
| 2003/0162622 | A1 * | 8/2003 | Fusegi ............... B60K 23/04 |
| | | | 475/231 |
| 2017/0198800 | A1 * | 7/2017 | Onitake ............... F16D 11/14 |
| 2021/0372513 | A1 * | 12/2021 | Ohashi ............... F16H 48/38 |
| 2023/0406097 | A1 * | 12/2023 | Yang ............... B60K 23/08 |

FOREIGN PATENT DOCUMENTS

| DE | 102018210691 A1 | 1/2020 | |
| JP | 2003322240 A * | 11/2003 | ............. B60K 23/04 |

* cited by examiner

*Primary Examiner* — Tinh Dang

(74) *Attorney, Agent, or Firm* — McCoy Russell LLP

(57) ABSTRACT

Methods and systems are provided for a disconnect device. In one example, a system for an electric drivetrain comprises a differential and a disconnect device arranged in a transmission housing and coupled to the differential, the disconnect device comprising a plurality of cam ring lugs engaged with a differential case, wherein each of the plurality of cam ring lugs is asymmetric.

15 Claims, 6 Drawing Sheets

SYSTEMS FOR ELECTRIFIED VEHICLE

FIELD

The present description relates generally to systems for an electrified vehicle.

BACKGROUND AND SUMMARY

Electric and partially electric vehicles may utilize a parallel hybrid configuration where an electric motor/generator is used in a vehicle drive system. The electric motor/generator may include a permanent magnet that may be integrated into a transmission housing. During vehicle braking, the electric motor/generator may operate as a generator, providing braking torque and conserving vehicle kinetic energy or stored generated energy in batteries or other energy storage devices. The stored energy may power the electric motor/generator to provide torque to the vehicle drive system.

If the vehicle drive system includes an all-wheel drive unit with the permanent magnet, then the magnet may include a disconnect device to decouple the motor/generator from driven wheels when desired based on a vehicle control strategy or driver demands. The disconnect device may be actuated by a solenoid configured to engage or disengage a dog clutch. A return spring may be used in conjunction with the solenoid to separate the dog clutch during a disengagement condition and hold the dog clutch closed during an engagement condition.

When power to the motor is unintentionally removed due to a fault, the dog clutch may be moved to a disengaged position via a torque reversal that may allow the dog clutch to disengage. The magnet may generate a magnetic drag in the motor/generator which may trap torque in the system. However, a controller may not command the solenoid quickly enough to move the clutch to the disengaged position before drag torque from the motor/generator is generated. The drag torque from the motor/generator may increase a disconnect trapped torque above a threshold value, the threshold value based on an average disengagement torque of components using a dog clutch. During such a condition, the controller may no longer signal to the solenoid to overcome the force generated due to the drag torque, resulting the dog clutch not moving to the disengaged position.

In one example, the issues described above may be addressed by a system for an electric drivetrain comprising a differential and a disconnect device arranged in a transmission housing and coupled to the differential. The disconnect device may include a plurality of cam ring lugs engaged with a differential case, wherein each of the plurality of cam ring lugs is asymmetric.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
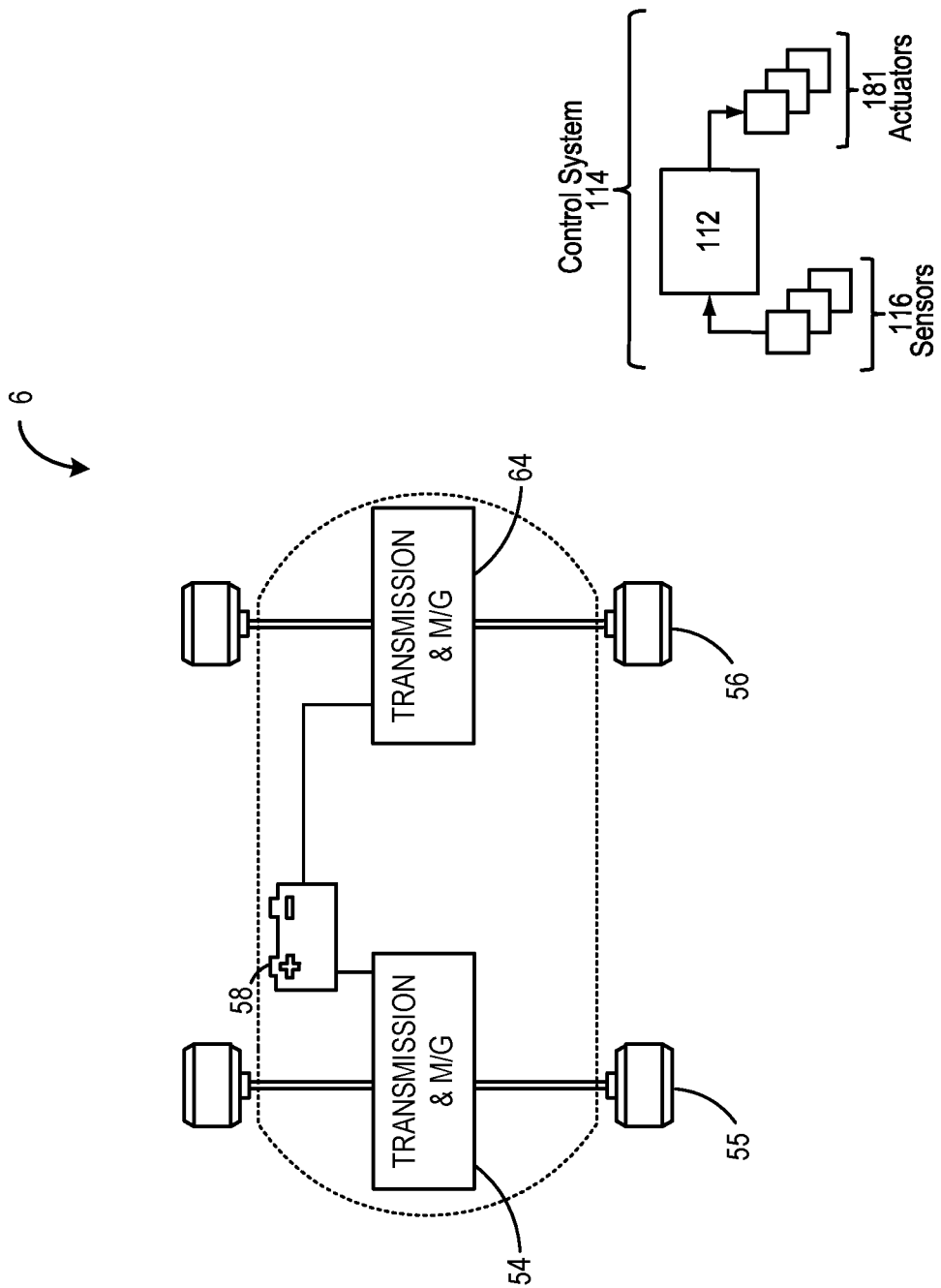
FIG. 1 shows an example of a vehicle system.
Figure 2:
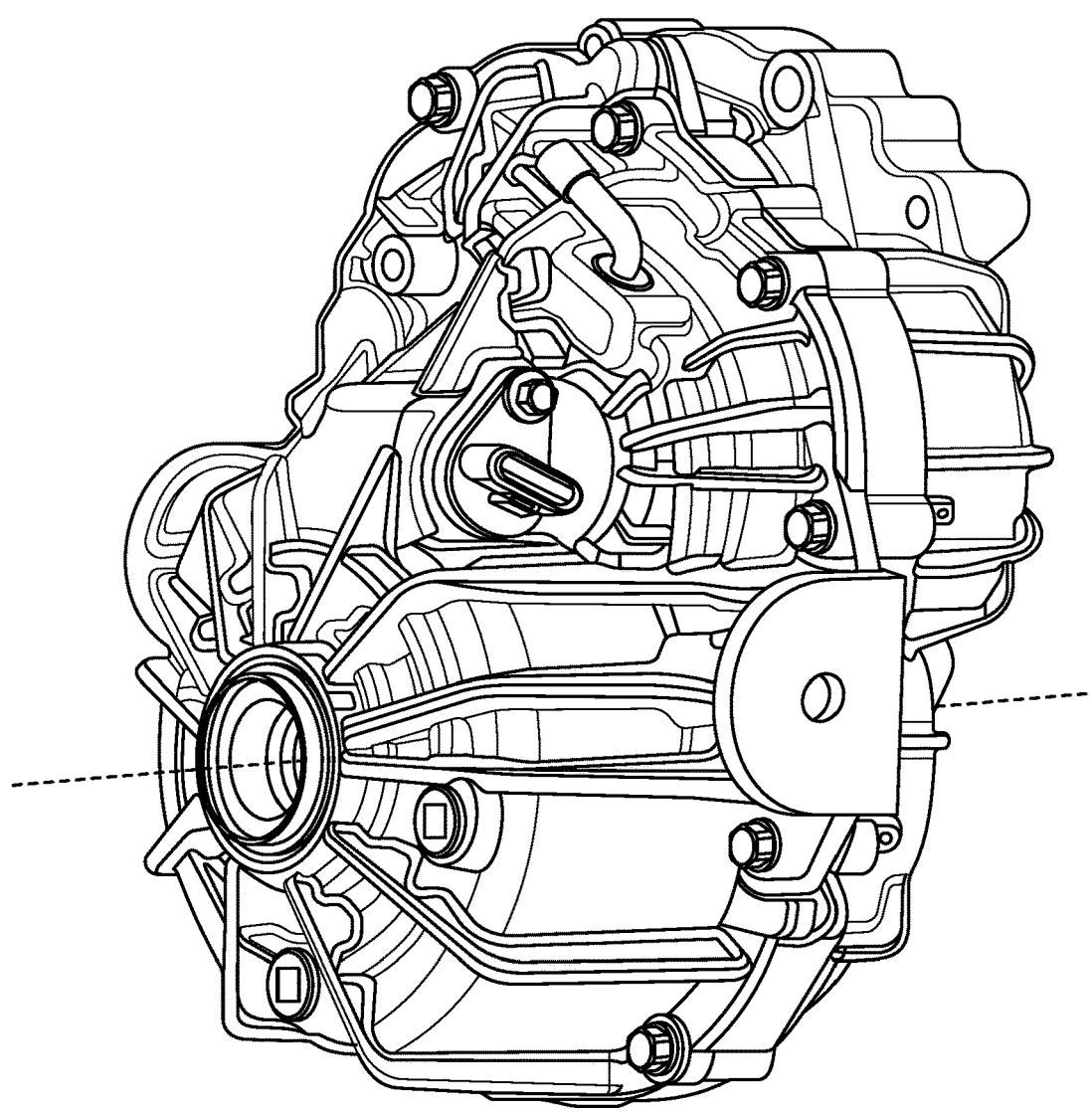
FIG. 2 shows an example of a gear box of the vehicle system.
Figure 2:
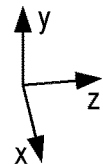

The following description relates to systems for an all-electric or partially electric vehicle, as shown in FIG. 1. The vehicle may include an electrified all-wheel drive (AWD) system including a magnetic motor and a disconnect device. An example of a transmission included in the AWD system is illustrated in FIG. 2. FIGS. 3, 4, 5, 6, and 7 illustrate different portions of the transmission along with the disconnect device.

The disconnect device may include a multi-angle cam lug on a differential locking mechanism. In one example, the multi-angle cam lug is asymmetric, with a drive flank including a first angle and a coast flank including a second angle, different than the first. By doing this, issues associated with cam ring lugs including symmetrical tooth flanks, as described above, may be avoided or mitigated.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-7 are shown approximately to scale, however, other dimensions may be used.

FIG. 1 shows a schematic depiction of a vehicle system 6 that can derive propulsion power from a first electric motor 54 and a second electric motor 64. Electric motors 54 and 64 may receive electrical power from a traction battery 58 to provide torque to rear vehicle wheels 55. Electric motors 54 and 64 may also be operated as a generator to provide electrical power to charge traction battery 58, for example, during a braking operation. It should be appreciated that while FIG. 1 depicts the first electric motor 54 mounted in a rear wheel drive configuration and second electric motor 64 mounted in a front wheel drive configuration, resulting in an all-wheel drive system. Additionally or alternatively, there may be only a single electric motor configured to drive a first differential of the rear wheels and a second differential of the front wheels.

Electric motors 54 and 64 may include a gearbox integrated therein (to be described further therein). The integrated gearbox may include a differential and a planetary gear set for transmitting power from the electric motor 54 to the rear vehicle wheels 55 or from electric motor 64 to front vehicle wheels 56. Electric motors 54 and 64 may also include at least one clutch. Controller 112 may send a signal to an actuator of the clutch to engage or disengage the clutch, so as to couple or decouple power transmission from the electric motors 54 and 64 to the rear vehicle wheels 55 or the front vehicle wheels 56. Additionally or alternatively, there may be multiple traction batteries configured to provide power to different driven wheels, wherein power to the wheels may be predicated based on traction at the wheels, driver demand, and other conditions. In one example, the vehicle system 6 includes an all-wheel drive vehicle system.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, etc. The controller 112 may receive input data from the various sensors, process the input data, and trigger the actuators in response to the processed input data based on instruction or code programmed therein corresponding to one or more routines.

Turning now to FIG. 2, it shows a transmission housing 200. In one example, the transmission housing 200 may be a housing of the transmission/electric motor 54 of FIG. 1. An axis system is included comprising an x-axis, a y-axis, and a z-axis. The x-axis may be parallel to a forward direction of vehicle travel. The y-axis is normal to the x-axis and parallel to a yaw axis of the vehicle and/or to a direction of gravity. The z-axis is normal to the x- and y-axes and parallel to an output shaft axis of the transmission housing 200.

Figure 3:
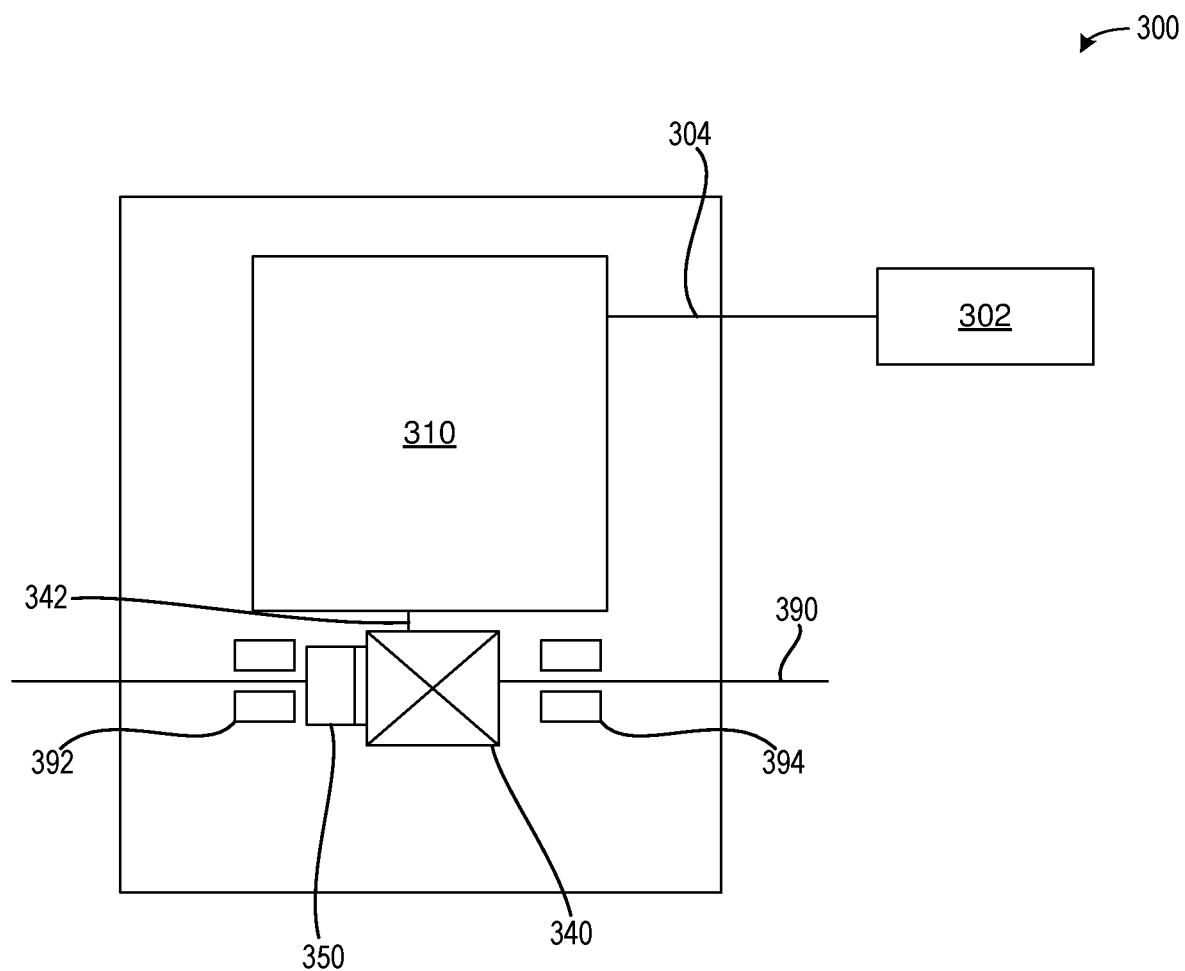
FIG. 3 shows a schematic of a gear arrangement of the gear box.

The transmission housing 200 may house a gear train 310, a differential 340, and a disconnect device 350 as shown in FIG. 3. FIG. 3 further illustrates a motor 302 coupled to a gear of the gear train 310. The gear may be an input gear, which may receive power from the motor 302 via a shaft 304. The shaft 304, along with portions of the motor 302 and the gear train 310 may be cooled via splined cooling.

The gear train 310 may include a plurality of gears coupled to one another via a meshed teeth or a common shaft. Gear ratios of the plurality of gears may adjust a rotational speed of an output shaft 390 coupled to wheels of the vehicle.

An output gear of the gear train 310 may drive the differential 340 via a shaft 342. The differential 340 may selectively provide power to different halves of the output shaft 390 via a coupling to first hypoid gears 392 and second hypoid gears 394. The differential 340, in combination with the first hypoid gears 392 and the second hypoid gears 394, may adjust a power output to each of the wheels based on a traction of each. For example, the traction of a first wheel coupled to a first portion of the output shaft 390 corresponding to the first hypoid gears 392 decreases, then power to a second wheel may increase or remain constant.

The disconnect device 350 may be arranged in the transmission housing 300 and coupled to the differential 340. The disconnect device 350 may be configured to decouple the motor 302 from the wheels. That is to say, the disconnect device 350 may block transmission of power from the motor 302 to the wheels via a dog clutch. The differential 340 and the disconnect device 350 are illustrated in greater detail with respect to FIG. 4.

Figure 4:
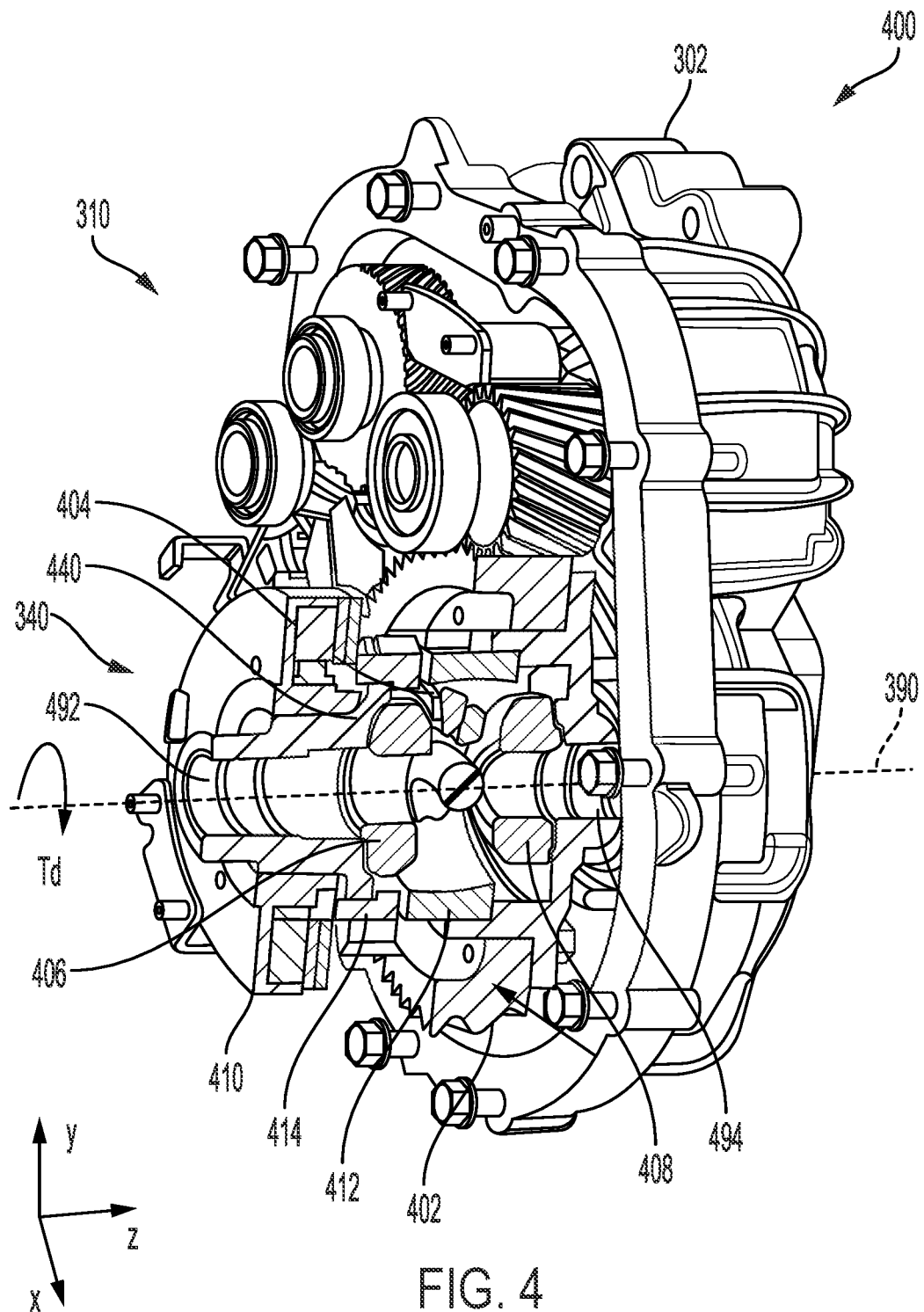
FIG. 4 shows the gear box of FIG. 2 with the cover removed and a cross-section of a differential coupled to the gear arrangement.
Figure 5:
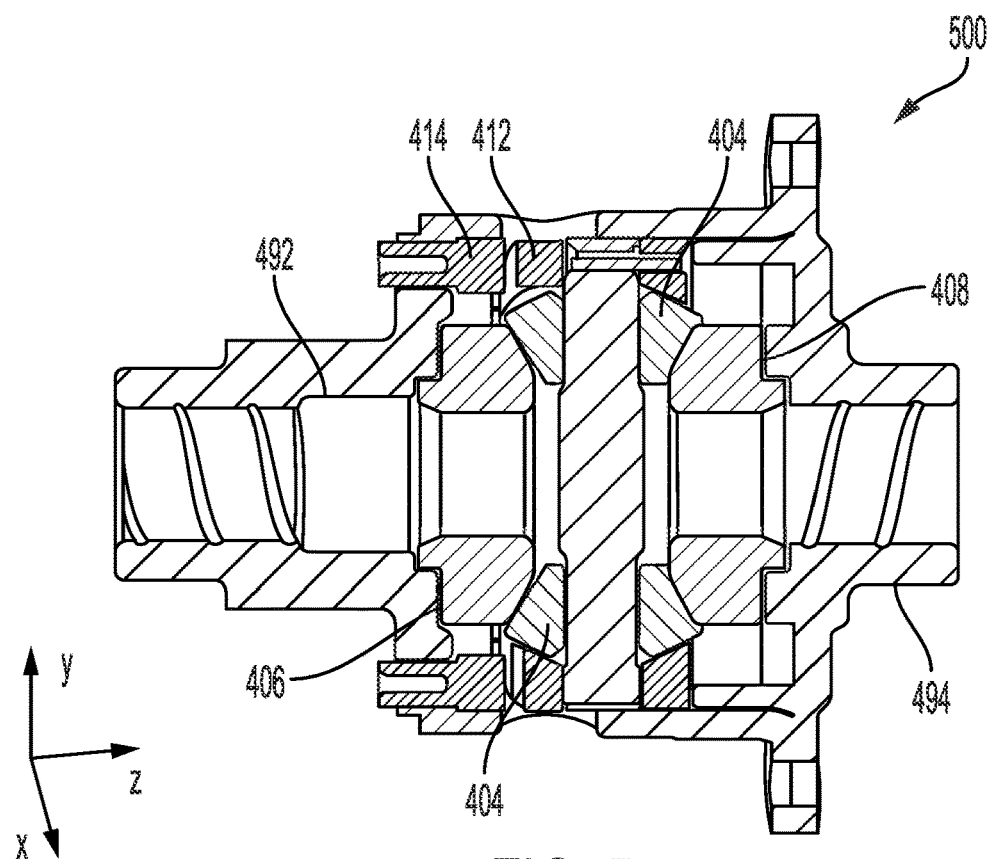
FIG. 5 shows a cross-sectional view of the differential of FIG. 4, including a dog clutch.

Turning now to FIGS. 4 and 5, they show views 400 and 500, respectively, of a cross-section of the differential 340 taken along the y-z plane. The differential 340 may receive power from the gear train 310 via an output gear 402. The output gear 402 may drive a differential gear 412 when a cam ring 414 is in a closed position (e.g., an engaged position). A position of the cam ring 414 may be adjusted via a solenoid 410. The solenoid 410 may be communicatively coupled to the controller (e.g., controller 112 of FIG. 1) and receive signals therefrom. The differential gear 412 may drive a pinion gear 404 engaged with a first side gear 406 (e.g., first hypoid gear 392 of FIG. 3) and a second side gear 408 (e.g., second hypoid gear 394 of FIG. 3). The first side gear 406 may drive a first output shaft 492 coupled to a first wheel and the second side gear 408 may drive a second output shaft 494 coupled to a second wheel.

Figure 6:
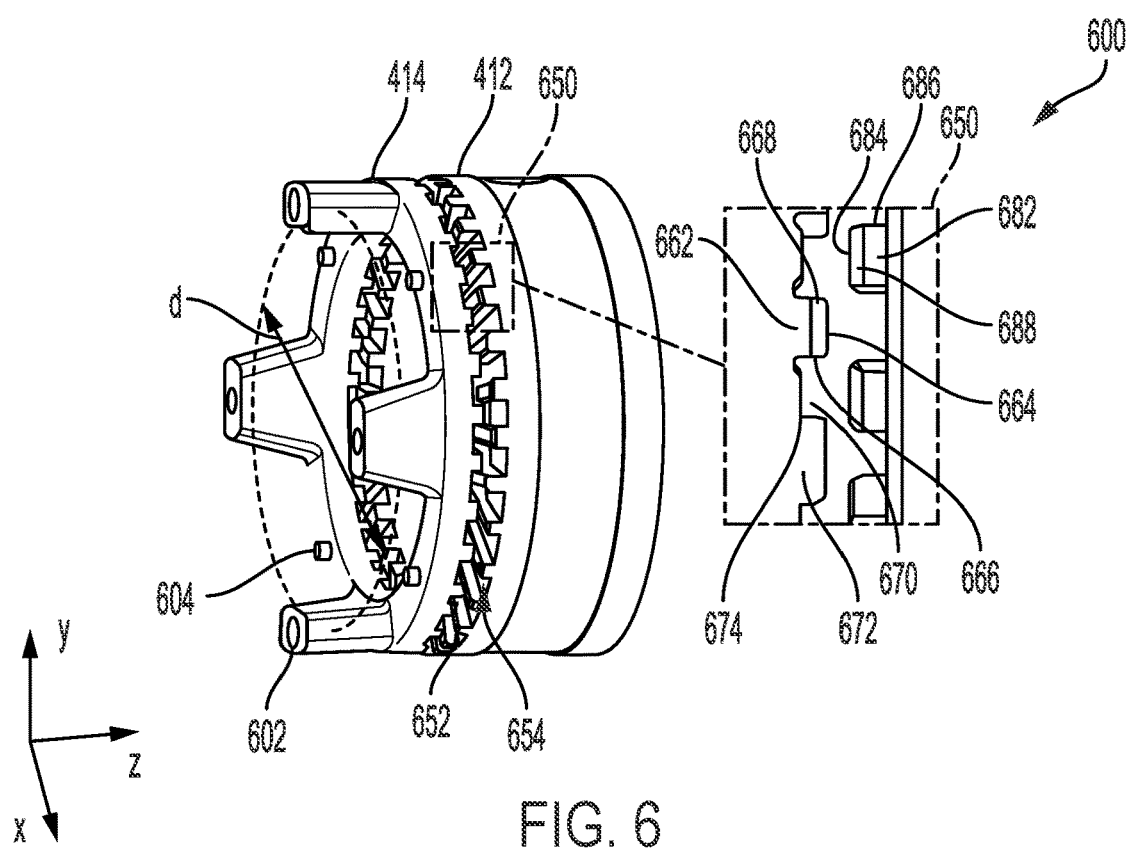
FIG. 6 shows a view of the dog clutch of FIG. 5.

Turning now to FIG. 6, it shows a view 600 of the differential ring 412 and the cam ring 414. The cam ring 414 may include a plurality of cam ring lugs 602 and a plurality of protrusions 604 on a same side of the cam ring 414 and facing the same direction. The plurality of cam ring lugs 602 and the plurality of protrusions 604 may be arranged such that a cam ring lug is arranged between adjacent protrusions of the plurality of protrusions 604. Similarly, a protrusion is arranged between adjacent cam ring lugs of the plurality of cam ring lugs 602. The plurality of cam ring lugs is described in greater detail with respect to FIG. 7.

The plurality of protrusions 604 may comprise a circular cross-sectional shape. The plurality of protrusions 604 may interface with a differential case. The plurality of protrusions 604 may be used to arrange the cam ring 414 in a desired position.

A plurality of cam teeth 652 of the cam ring 414 and a plurality of differential teeth 654 of the differential ring 412 may be in meshed engagement. The plurality of cam teeth 652 may extend toward the differential 340 away from a first wheel of the vehicle. The plurality of differential teeth 654 may extend toward the cam ring 414 and the first wheel. A size of the cam teeth and the differential teeth may correspond to a space between adjacent teeth of the cam teeth and differential teeth such that the two may be in meshed engagement. For example, a differential tooth of the plurality of differential teeth 654 may fit between adjacent teeth of the plurality of cam teeth 652. Similarly, a cam tooth of the plurality of cam teeth 652 may fit between adjacent teeth of the plurality of differential teeth 654. Shapes of the plurality of cam teeth 652 and the plurality of differential teeth 654 are shown in greater detail a detailed view illustrating the dog clutch 650.

A cam tooth 662 of the plurality of cam teeth 652 may include a top surface 664 coupled to side surfaces 666. The cam tooth 662 may further include chamfers 668 arranged on sides of the top surface 664 not coupled to the side surfaces 666. Gaps 670 between adjacent teeth of the plurality of cam teeth 652 may include recesses 672 flanking each of the plurality of cam teeth 652. That is to say, a pair of recesses 672 may sandwich the cam tooth 662. The recesses 672 may be identical in size and shape to one another. The recesses 672 may comprise a curved profile.

A gap surface 674 may be arranged in each of the gaps 670. The gap surface 674 may be arranged between a pair of recesses 672. In this way, a recess of the recesses 672 may be positioned between the cam tooth 662 and the gap surface 674. The gap surface 674 may be raised relative to the recesses 672 along the z-axis.

A differential tooth 682 of the plurality of differential teeth 654 may include a top surface 684 coupled to side surfaces 686. The top surface 684 may include chamfer 688 arranged on sides of the top surface 684 not coupled to the side surfaces 686. The differential tooth 682 may extend into a gap of the gaps 670 between the plurality of cam teeth 652. The plurality of cam teeth 652 and the plurality of differential teeth 654 may then be in a meshed engagement and interact with one another.

Figure 7:
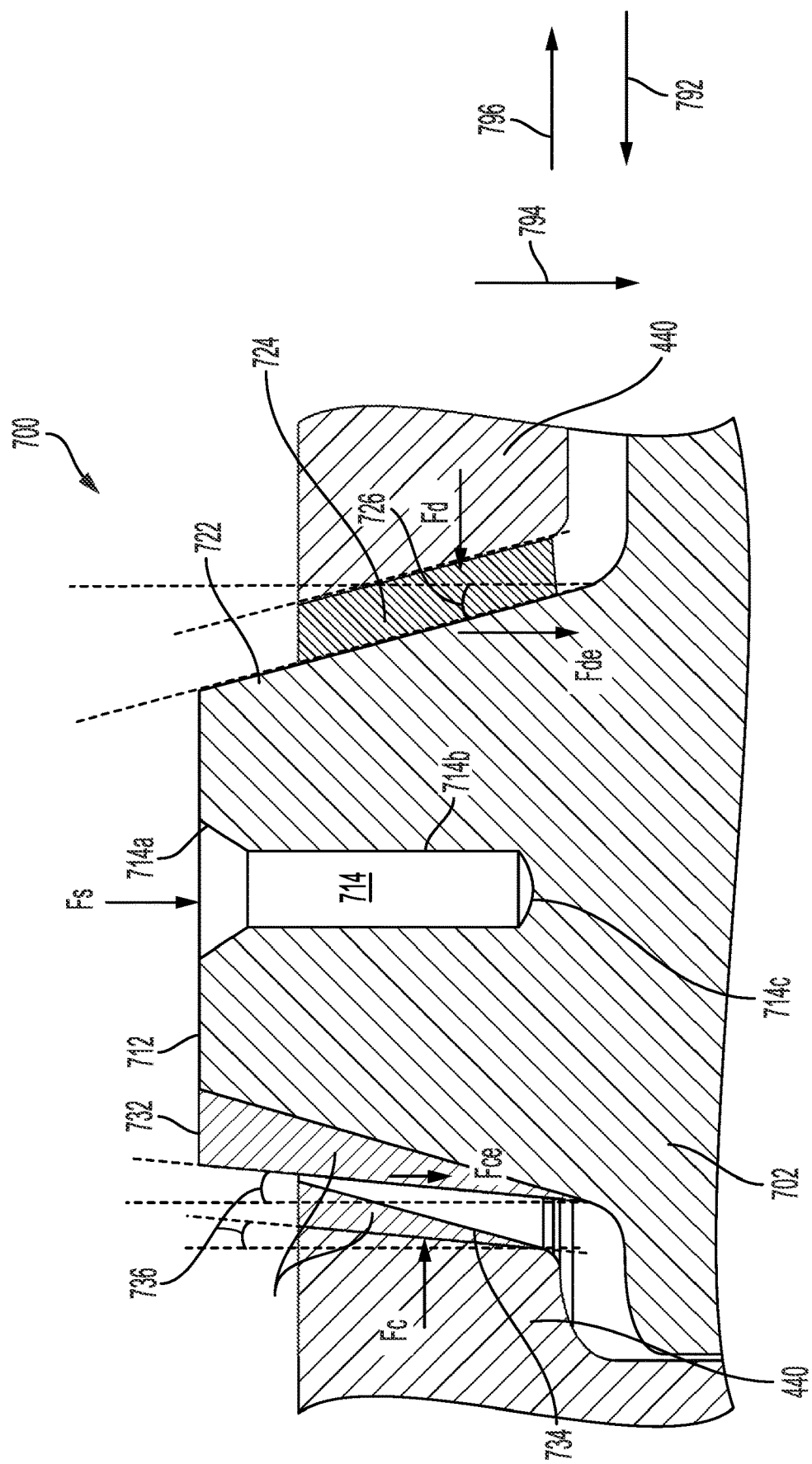
FIG. 7 shows a schematic of a loading diagram including forces acting on a dog tooth from a differential case.

Turning now to FIG. 7, it shows a cam ring lug 702. In one example, the cam ring lug 702 is an example of one of the plurality of cam ring lugs 602 of the cam ring 414 of FIG. 6. The cam ring lug 702 includes a trapezoidal cross-sectional shape taken in a direction parallel to an output axis of the differential.

The cam ring lug 702 may include a solenoid interface surface 712 coupled to a drive flank 722 and a coast flank 732. An opening 714 extends through the solenoid interface surface 712 toward a dog clutch side of the cam ring 414. The cam ring lug 702 may be completely solid except for the opening 714 extending therethrough. The opening 714 may be between the drive flank 722 and the coast flank 732. In one example, the opening 714 is substantially equidistant to each of the drive flank 722 and the coast flank 732. As will be described herein, the cam ring lug 702 may be asymmetrical due to an angle of each of the coast flank 732 and the drive flank 722. In some embodiments, the opening 714 may be biased toward one of the drive flank 722 or the coast flank 732.

The opening 714 may include an inlet 714a, a body 714b, and an end 714c. The inlet 714a may decrease in diameter in a direction toward the dog clutch side of the cam ring 414. The body 714b may include a uniform diameter throughout its length from the inlet 714a to the end 714c. The end 714c may decrease in diameter, wherein the end 714c may include a rounded tip. An engagement feature of the solenoid may protrude into the opening 714, which may allow the solenoid to control a position of the cam ring 414.

The drive flank 722 may comprise a gap 724 arranged between it and the differential case body 440. The gap 724 may be present when the cam ring 414 is in an open position during a coasting condition. The gap 724 may be filled under load conditions (e.g., engaged conditions) when the cam ring 414 is in a closed position via the drive flank 722 and the differential case body 440 touching. The drive flank 722 may receive a drive force, $F_d$, in a first direction 792 and a drive engagement force, $F_{de}$, in a second direction 794, normal to the first direction 792 and based on a drive angle 726. The drive angle 726 may be between the drive flank 722 and the differential case body 440.

The coast flank 732 may comprise a gap 734 arranged between it and the differential case body 440. The gap 734 may be present when the cam ring 414 is in a closed position during a drive condition. The gap 734 may be filled under coast conditions when the cam ring 414 is in the open position via the coast flank 732 and the differential case body 440 touching. The coast flank 732 may receive a coast force, $F_c$, in a third direction 796, opposite the first direction 792 and normal to the second direction 794. The coast flank 732 may further receive a coast engagement force, $F_{ce}$, in the second direction 794. The coast engagement force, $F_{ce}$, may be proportional to a coast angle 736 of the coast flank 732 and the differential case body 440.

In the previous examples of the cam ring 414, the coast angle and the drive angle may be substantially equal, which may result in a forced needed to disengage the dog clutch to be higher than a design of the disengagement device, resulting in alternative designs that may increase a packaging space, mass, and/or cost of the device. The trapped torque may be due to magnetic drag generated when the magnetic motor is not powered, resulting in contact on the coast side of the cam ring lug and the differential case body. The drive engagement force may then combat the coast side force, which may not be overcome via a command signal.

In one example, the coast angle 736 may be less than the drive angle 726. The coast angle 736 may be decreased via a modification of a ramp angle at an interface of each of the coast flank 732 and the differential case body 440 at the coast flank side. Thus, the modification may be to both the cam ring 414 and the differential case body 440. In one example, the drive angle 726 is 2-8 times larger than the coast angle 736. Other angular proportions may be used if desired.

The coast angle 736 is reduced, which may result in a reduced coast engagement force, $F_{ce}$, and mitigated higher than desired trapped torque in a coast direction (e.g., the third direction 796). This may reduce a force needed by the solenoid and return spring thereof to disengage the dog clutch. The reduced force allows the disengagement operation during the coast side trapped torque condition from the permanent magnet motor drag.

An engagement load is calculated via equation 1 below:

$$F_e = F_d \sin \theta \qquad \text{equation 1}$$

Assuming $F_d$, is constant for both the drive flank 722 and the coast flank 732, the sin of a larger angle will be greater than the sin of a smaller angle. For example, if the drive angle is 15 degrees and the coast angle is 2 degrees, then the engagement force, $F_e$, of the coast side may be reduced by 86% relative to the drive side. This may result in a smaller differential packaging along with a reduced manufacturing cost. In some examples, the drive angle is between 10-30 degrees and the coast angle is between 1-15 degrees. More specifically, the drive angle may be between 10-20 degrees and the coast angle may be between 1-5 degrees.

The technical effect of reducing the coast angle of the coast flank is to reduce torque trapped in the disengagement system. By doing this, the disengagement system may not demand additional devices for disengaging the dog clutch even when torque is trapped, which may result in reduce manufacturing costs and a smaller packaging size of the disengagement system.

The disclosure provides support for a system including an electric drivetrain comprising a differential and a disconnect device arranged in a transmission housing and coupled to the differential, the disconnect device comprising a plurality of cam ring lugs engaged with a differential case, wherein each of the plurality of cam ring lugs is asymmetric. A first example of the system further includes where each of the plurality of cam ring lugs comprises a drive flank and a coast flank, wherein a drive angle between the drive flank and the differential case is greater than a coast angle between the coast flank and the differential case. A second example of the system, optionally including the first example, further includes where each of the plurality of cam ring lugs comprises a solenoid interface positioned between the drive flank and the coast flank. A third example of the system, optionally including the first and second examples, further includes where the electric drivetrain comprises a permanent magnetic drive motor. A fourth example of the system, optionally including the first and second examples, further includes where the electric drivetrain is an all-wheel drive electric drivetrain. A fifth example of the system, optionally including the first and second examples, further includes where a disengagement force of a dog clutch of the disconnect device is less than an engagement force of the dog clutch. A sixth example of the system, optionally including the first and second examples, further includes where the plurality of cam ring lugs extends in a direction away from a differential ring of the differential.

The disclosure further provides support for a disconnect device configured to disconnect a magnetic motor from driven wheels of a vehicle, the disconnect device including a cam ring coupled to a differential via a dog clutch, the cam ring comprising a plurality of cam ring lugs each including a coast flank and a drive flank interfacing with a differential case, wherein a coast angle between the coast flank and the differential case is smaller than a drive angle between the drive flank and the differential case. A first example of the disconnect device further includes where a drive engagement load applied to the drive flank is greater than a coast engagement load applied to the coast flank. A second example of the disconnect device, optionally including the first example, further includes where a solenoid engages with the plurality of cam ring lugs via a solenoid interface arranged at each of the plurality of cam ring lugs, the solenoid interface comprising an opening that extends into each of the plurality of cam ring lugs between the coast flank and the drive flank. A third example of the disconnect device, optionally including one or more of the previous examples, further includes where the solenoid interface is equidistant to the drive flank and the coast flank. A fourth example of the disconnect device, optionally including one or more of the previous examples, further includes where each of the plurality of cam ring lugs is asymmetric. A fifth example of the disconnect device, optionally including one or more of the previous examples, further includes where the plurality of cam ring lugs interface with a portion of the differential case opposite from the dog clutch. A sixth example of the disconnect device, optionally including one or more of the previous examples, further includes where the drive angle is 2-8 times larger than the coast angle. A seventh example of the disconnect device, optionally including one or more of the previous examples, further includes where the dog clutch comprises a plurality of cam teeth and a plurality of differential teeth, wherein the plurality of cam teeth extends in a direction opposite a direction in which the plurality of cam ring lugs extends, the plurality of differential teeth extending in the direction parallel to the direction in which the plurality of cam ring lugs extends.

The disclosure further provides support for an electric vehicle including a transmission coupled to a magnet motor, the transmission comprising a differential coupled to a disconnect device via a dog clutch along an axle coupled to drive wheels of the electric vehicle, wherein the disconnect device comprises a plurality of cam ring lugs arranged on a side of a cam ring facing a direction away from the differential, wherein each of the plurality of cam ring lugs is asymmetric. A first example of the electric vehicle further includes where each of the plurality of cam ring lugs comprises a coast flank and a drive flank, and wherein a coast angle between the coast flank and a differential case is steeper than a drive angle between the drive flank and the differential case. A second example of the electric vehicle, optionally including the first example, further includes where a drive gap is present when the differential case touches the coast flank during a coast condition, and wherein a coast gap is present when the differential case touches the drive flank during a drive condition. A third example of the electric vehicle, optionally including one or more of the previous examples, further includes where the coast condition comprises decoupling the magnet motor from the drive wheels. A fourth example of the electric vehicle, optionally including one or more of the previous examples, further includes where a disengagement force to enter the coast condition is less than an engagement force to enter the drive condition.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   an electric drivetrain comprising a differential; and
   a disconnect device arranged in a transmission housing and coupled to the differential via a dog clutch, the disconnect device comprising a plurality of cam ring lugs engaged with a differential case, wherein each of the plurality of cam ring lugs is asymmetric, wherein each of the plurality of cam ring lugs comprises a drive flank and a coast flank, wherein a drive angle between the drive flank and the differential case is greater than a coast angle between the coast flank and the differential case, and wherein a drive gap is present when the differential case touches the coast flank during a coast condition, and wherein a coast gap is present when the differential case touches the drive flank during a drive condition, wherein the coast condition comprises decoupling a magnet motor of the electric drivetrain from drive wheels.

2. The system of claim 1, wherein each of the plurality of cam ring lugs comprises a solenoid interface positioned between the drive flank and the coast flank.

3. The system of claim 1, wherein the electric drivetrain is an all-wheel drive electric drivetrain.

4. The system of claim 1, wherein the drive angle between the drive flank and the differential case is 2-8 times larger than the coast angle between the coast flank and the differential case.

5. The system of claim 1, wherein the plurality of cam ring lugs extends in a direction away from a differential ring of the differential.

6. A disconnect device configured to disconnect a magnetic motor from driven wheels of a vehicle, the disconnect device comprising:
   a cam ring coupled to a differential via a dog clutch, the cam ring comprising a plurality of cam ring lugs each asymmetric and including a coast flank and a drive flank interfacing with a differential case, wherein a coast angle between the coast flank and the differential case is smaller than a drive angle between the drive flank and the differential case, and wherein a drive gap is present when the differential case touches the coast flank during a coast condition, and wherein a coast gap is present when the differential case touches the drive flank during a drive condition, wherein the coast condition comprises decoupling the magnetic motor of the electric drivetrain from drive wheels.

7. The disconnect device of claim 6, wherein a drive engagement load applied to the drive flank is greater than a coast engagement load applied to the coast flank.

8. The disconnect device of claim 7, wherein a solenoid engages with the plurality of cam ring lugs via a solenoid interface arranged at each of the plurality of cam ring lugs, the solenoid interface comprising an opening that extends into each of the plurality of cam ring lugs between the coast flank and the drive flank.

9. The disconnect device of claim 8, wherein the solenoid interface is equidistant to the drive flank and the coast flank.

10. The disconnect device of claim 6, wherein the plurality of cam ring lugs interface with a portion of the differential case opposite from the dog clutch.

11. The disconnect device of claim 8, wherein the drive angle is 2-8 times larger than the coast angle.

12. The disconnect device of claim 6, wherein the dog clutch comprises a plurality of cam teeth and a plurality of differential teeth, wherein the plurality of cam teeth extends in a direction opposite a direction in which the plurality of cam ring lugs extends, the plurality of differential teeth extending in the direction parallel to the direction in which the plurality of cam ring lugs extends.

13. An electric vehicle, comprising:
a transmission coupled to a magnet motor, the transmission comprising a differential coupled to a disconnect device via a dog clutch along an axle coupled to drive wheels of the electric vehicle, wherein the disconnect device comprises a plurality of cam ring lugs arranged on a side of a cam ring facing a direction away from the differential, wherein each of the plurality of cam ring lugs is asymmetric, wherein a drive gap is present when the differential case touches a coast flank during a coast condition, and wherein a coast gap is present when the differential case touches a drive flank during a drive condition, wherein the coast condition comprises decoupling the magnet motor from the drive wheels.

14. The electric vehicle of claim 13, wherein each of the plurality of cam ring lugs comprises the coast flank and the drive flank, and wherein a coast angle between the coast flank and a differential case is steeper than a drive angle between the drive flank and the differential case.

15. The electric vehicle of claim 13, wherein a disengagement force to enter the coast condition is less than an engagement force to enter the drive condition.

\* \* \* \* \*